May 29, 1934.  B. McCANDLESS  1,960,254
PHOTOGRAPHIC APPARATUS
Filed Aug. 31, 1931  6 Sheets-Sheet 1
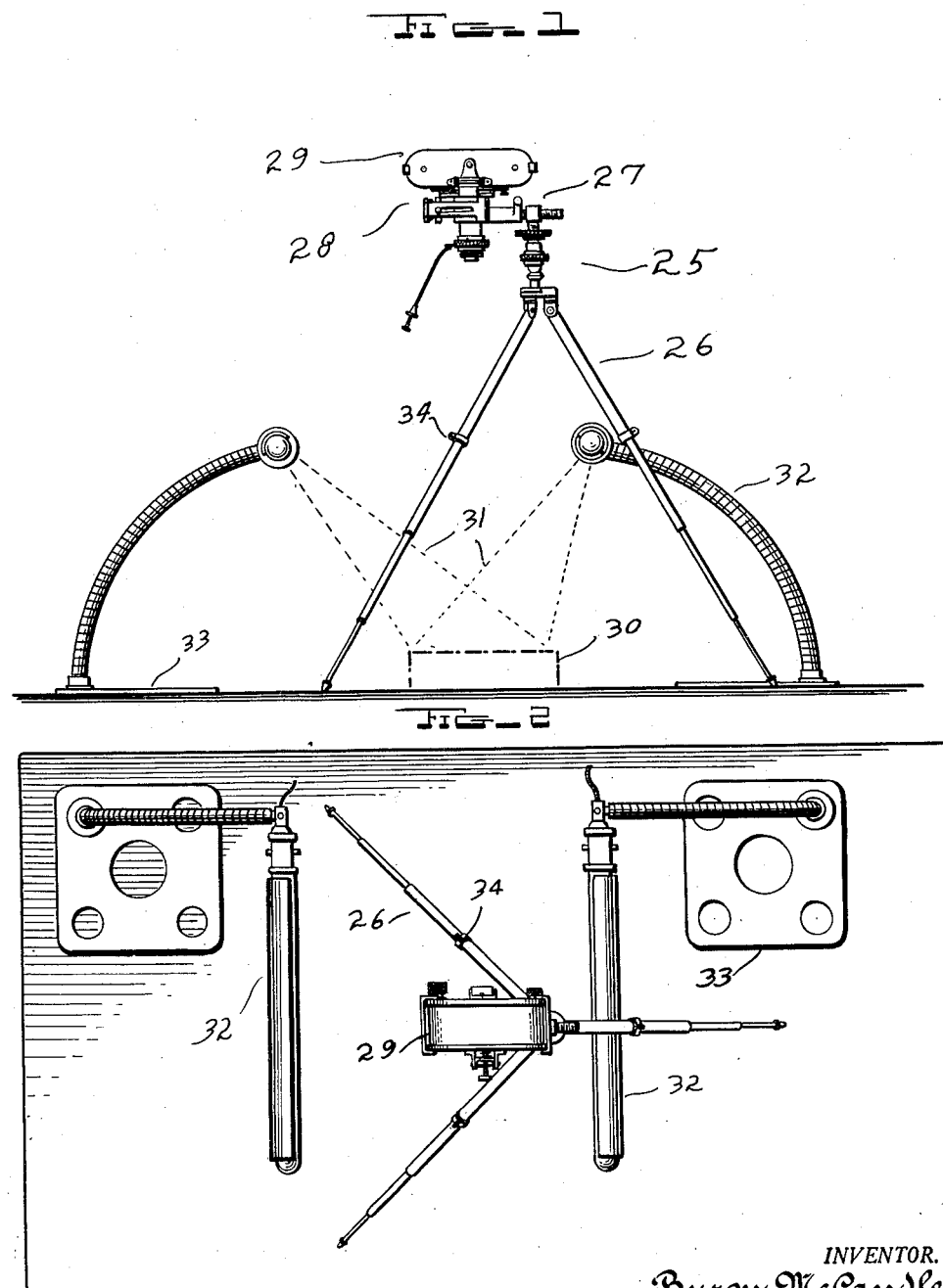

May 29, 1934.  B. McCANDLESS  1,960,254
PHOTOGRAPHIC APPARATUS
Filed Aug. 31, 1931  6 Sheets-Sheet 2
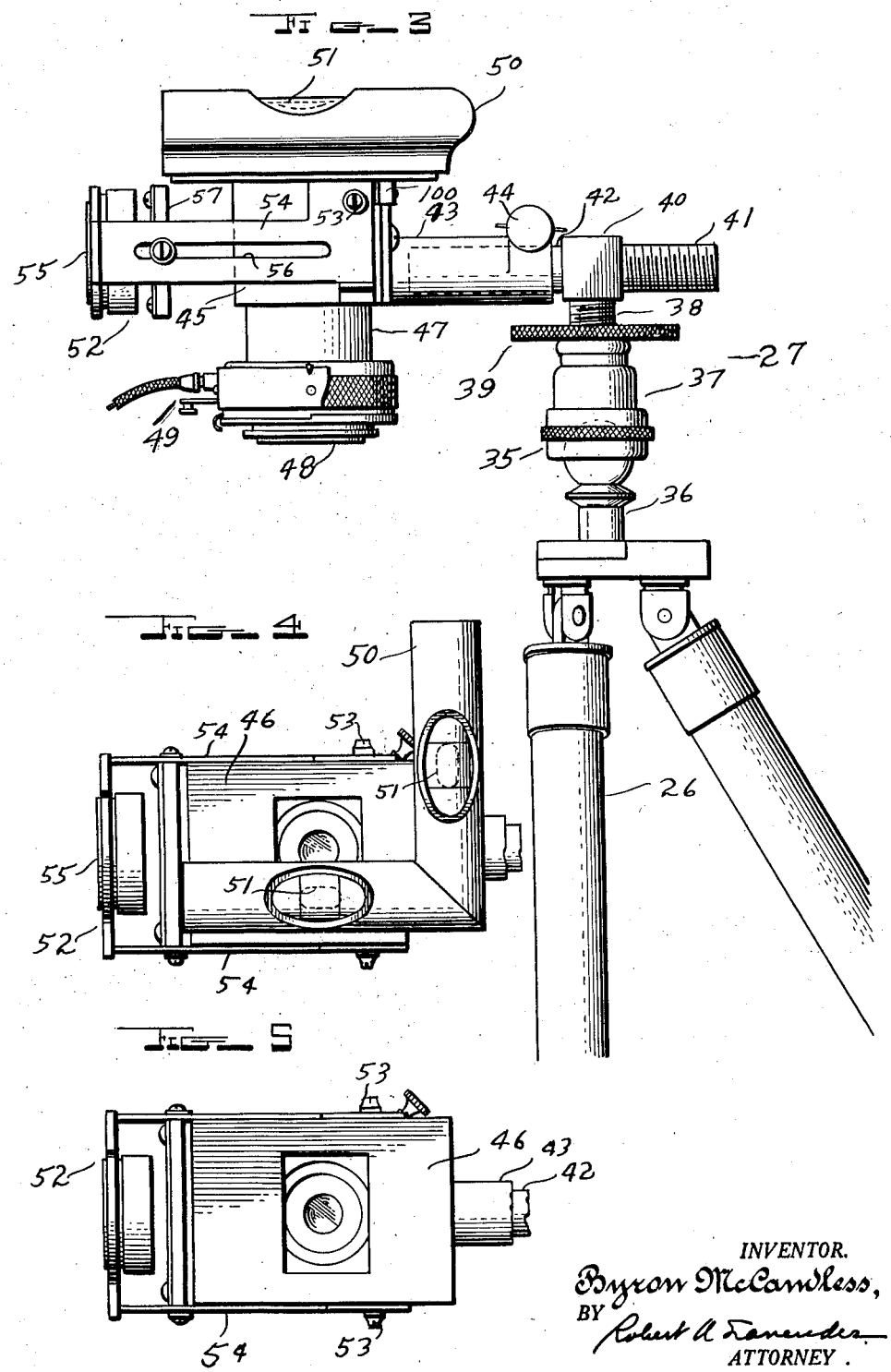
INVENTOR.
Byron McCandless,
BY
Robert A. Lavender
ATTORNEY.

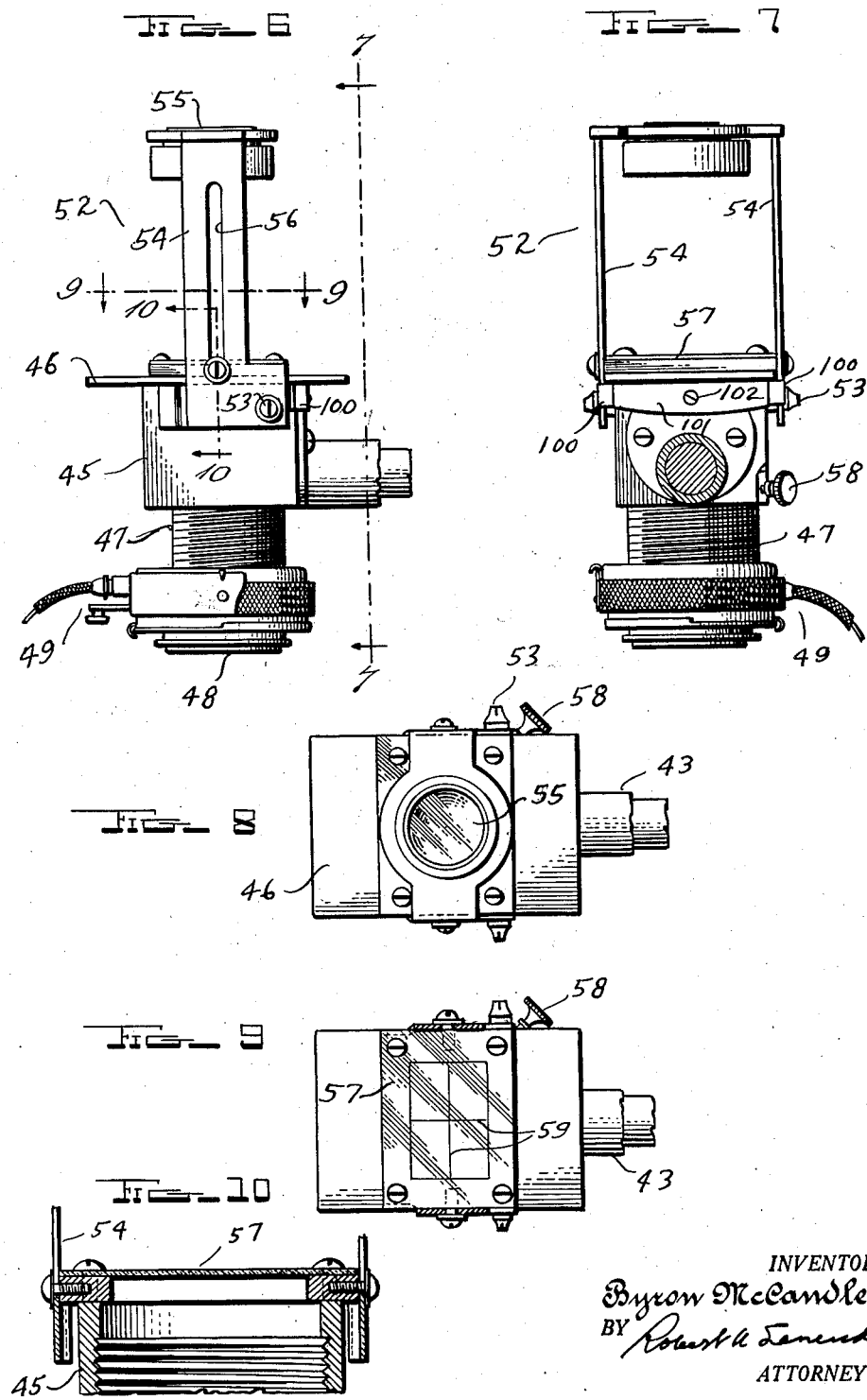

May 29, 1934.  B. McCANDLESS  1,960,254
PHOTOGRAPHIC APPARATUS
Filed Aug. 31, 1931  6 Sheets-Sheet 4
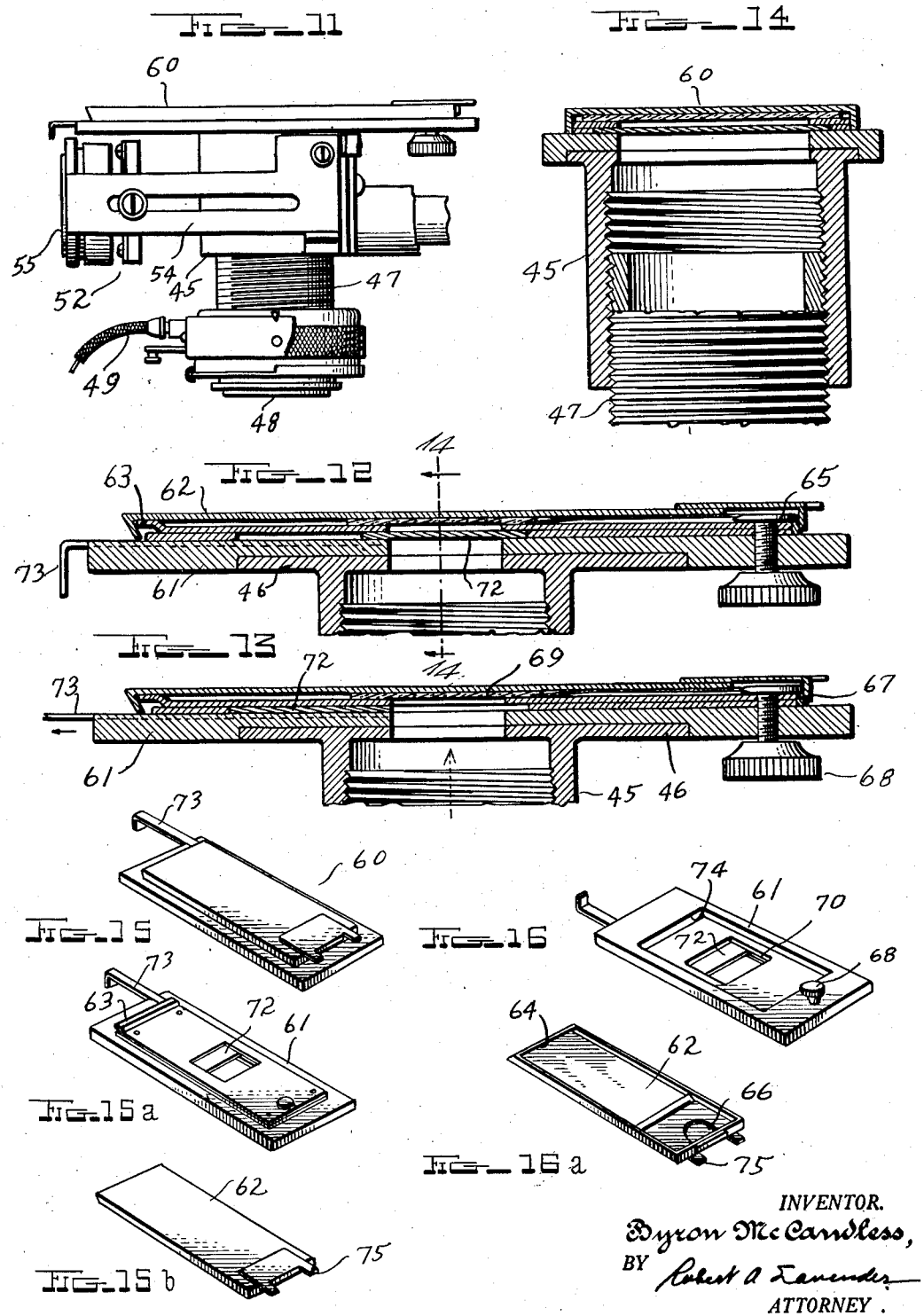

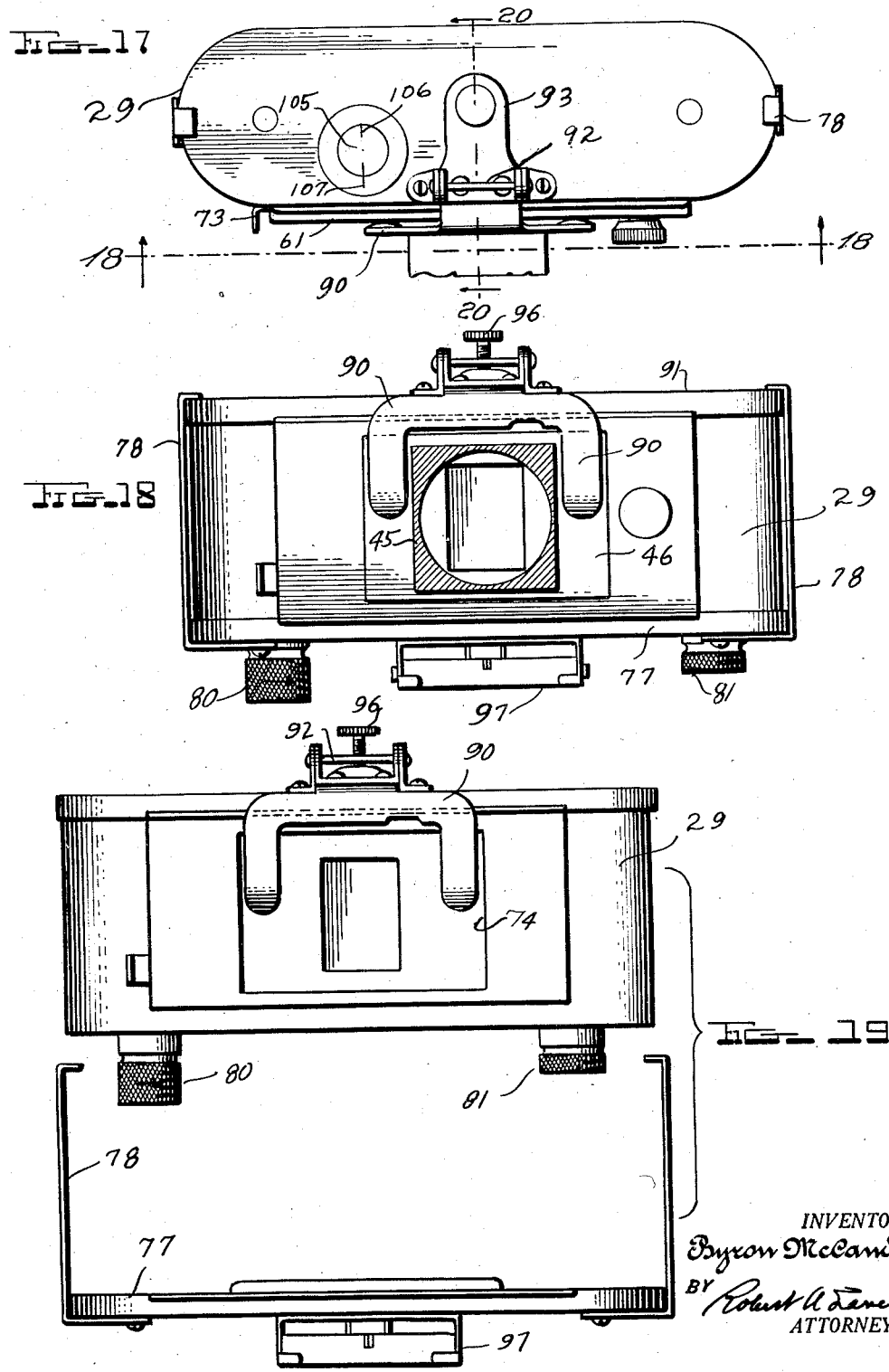

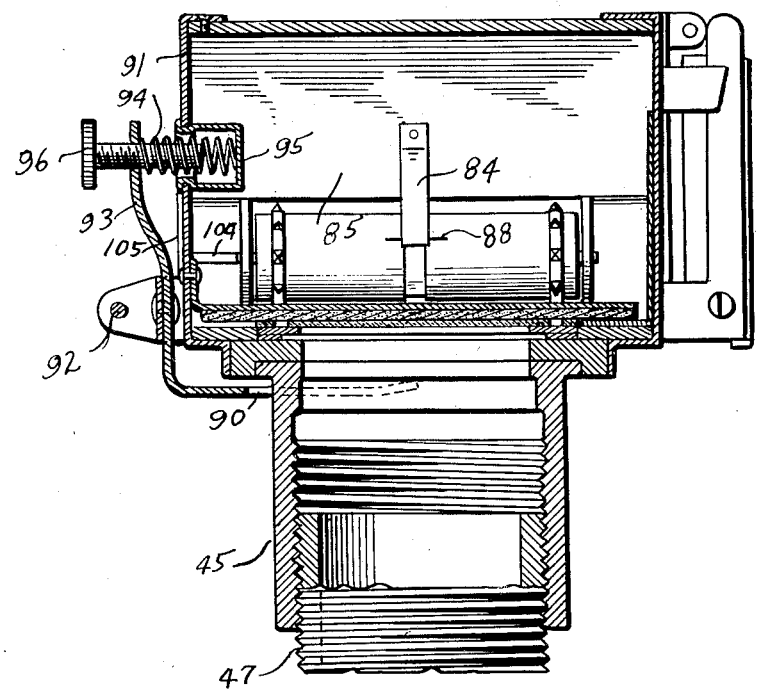
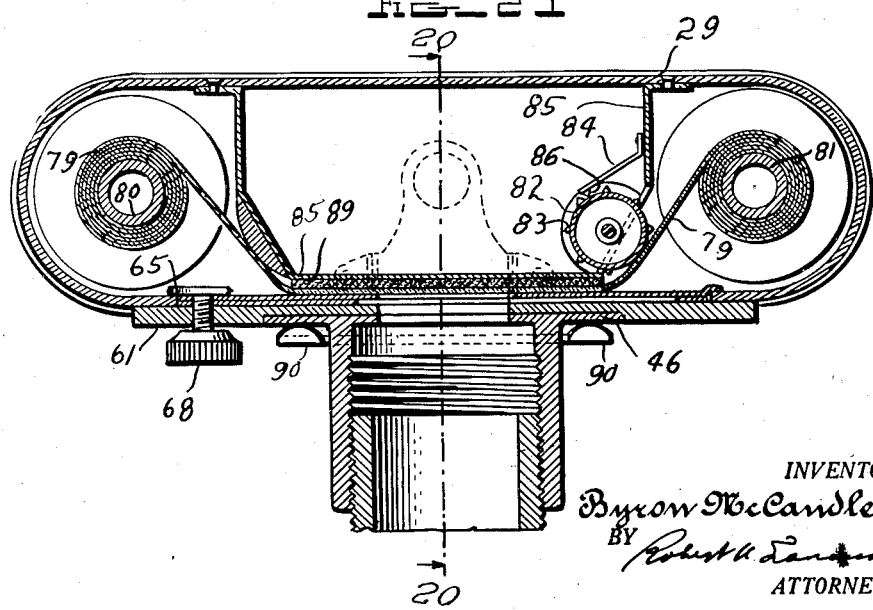

Patented May 29, 1934

1,960,254

UNITED STATES PATENT OFFICE 1,960,254

PHOTOGRAPHIC APPARATUS

Byron McCandless, United States Navy

Application August 31, 1931, Serial No. 560,254

10 Claims. (Cl. 95—34)

(Granted under the act of March 3, 1883, as amended April 30, 1928; 370 O. G. 757)

This invention relates to a photographic apparatus and has for an object to provide a photographic apparatus that is particularly adapted for taking pictures of scenes or for reproduction of books, manuscripts, or of any type of data without being under the necessity of removing the data from whatever location it may be in. An advantage of this particular apparatus is that it is relatively inexpensive and has such portability qualities that it may be readily transported and set up for quickly taking pictures of any object. In many instances reproductions of rare books may be taken and assembled on the same film to thereafter enable a continuous lecture to be given to a group of students which ordinarily would not even be available. That is to say, considerable information exists hidden away in libraries in rare and valuable books and manuscripts which is usually unavailable and inaccessible to students and others. The apparatus of this invention enables much of this valuable information to be assembled for reproduction purposes in an intensely interesting form before a student body. Photographs of machinery and parts thereof, as well as of usually inaccessible engineering works may be taken for the instruction of engineering students and personnel, and it may be of equally beneficial use in many other walks of life.

A further object of this invention is to provide an easily portable camera apparatus that may be used for recording data that may be located in inaccessible places, and which data may not be easily removable.

A further object of this invention is to provide a quick and easy means for testing the exposure conditions before commencing to record the available data.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 is a side elevational view of this photographic apparatus in operative position for recording data;

Fig. 2 is a top plan view of Fig. 1;

Fig. 3 is a side elevational view of the camera lens in the process of being leveled;

Fig. 4 is a top plain view of Fig. 3;

Fig. 5 is a view similar to Fig. 4 with the leveling means removed;

Fig. 6 is a side elevation of the camera lens with the focusing means in vertical operative position;

Fig. 7 is a side elevation on lines 7—7 of Fig. 6;

Fig. 8 is a top plan view of Fig. 6;

Fig. 9 is a view on lines 9—9 of Fig. 6;

Fig. 10 is a vertical sectional view on lines 10—10 of Fig. 6;

Fig. 11 is a side elevation of the lens with a film holder thereon;

Fig. 12 is a central, vertical, longitudinal section view of Fig. 11;

Fig. 13 is a view similar to Fig. 12 with the slide withdrawn to permit the film to be exposed.

Fig. 14 is a vertical sectional view on lines 14—14 of Fig. 12;

Fig. 15 is a perspective view showing the complete film holder;

Fig. 15a is a perspective view of the film slide plate;

Fig. 15b is a perspective view of the film receiving plate;

Fig. 16 is a perspective view of the reverse side of Fig. 15a;

Fig. 16a is a perspective view of the reverse side of Fig. 15b;

Fig. 17 is a side elevation of the camera as clamped in position;

Fig. 18 is a section on lines 18—18 of Fig. 17;

Fig. 19 is a view similar to Fig. 18 with one side of the camera detached for loading and unloading the film;

Fig. 20 is a transverse section on lines 20—20 of Figs. 17 and 21;

Fig. 21 is a central, vertical longitudinal sectional view through the camera and adjacent parts.

There is shown at 25 a portable photographic or copying apparatus set up in its operative position. This apparatus comprises, broadly, a supporting tripod 26, a universal support 27, a camera 28 and roll-holding camera box 29. The object being photographed or copied as shown at 30, is lighted up by rays 31 from the lamps 32 which, as here shown, may be supported on their bases 33. It will be noted, however, that the tripod 26 has hooks 34 placed on the legs thereof and the lamps 32 may be alternatively supported by means of these hooks 34 instead of their bases or supports 33. The universal support or connection 27 between the camera and tripod 26 comprises a ball and socket joint 35, one member of which, 36, is threaded so as to be connected to the tripod and the other member 37 is internally threaded to receive the threaded stud 38. A lock washer 39 on stud 38 may be tightened against the end of member 37 so as to hold the stud 38 securely against movement. The end 40 of stud 38 is internally threaded to receive the threaded end 41 of a rod 42.

The camera 28 has a supporting cylinder 43 adapted to be slid over the rod 42 and secured in position by a bolt and nut 44 tending to tighten the cylinder 43 about the rod 42. The supporting cylinder 43 is secured to an internally threaded box 45 to which is fixed the flat camera receiving plate 46, a lens barrel 47 having a camera lens 48 with its usual shutter and diaphragm controls 49. In order to set the camera 28 at direct horizontal level, a right angle, double spirit level 50 is placed on top of the plate 46 and the tripod 26 and support 27 are properly adjusted until the spirit level shows, by its air bubbles 51, that the plate is at the proper level.

A focusing lens 52 is pivotally secured at 53 so that it may be pivoted up into operative position as shown in Figs. 6 and 7, or swung downwardly out of operating position, as shown in Figs. 3, 4 and 5, it being yieldably held in either position by the bent ends 100 of the flat spring 101 centrally secured as at 102. A pair of arms 54 support the eye-piece 55. These arms 54 are slotted as at 56, whereby a ground glass 57 is slidably secured therein. When in operative position, this glass 57 will lie on top of plate 46 and by sighting through the eye-piece 55 the lens 48 may be properly focused on the object 30, the barrel 47 being threaded into or out of the box 45 until the proper focus is obtained whereupon the set screw 58 is tightened to retain the proper focus.

After the lens has been properly focused, the glass 57 is slid along the slots 56 permitting the focusing glass 52 to be turned about its pivot 53 to the horizontal position that it assumes to permit the film-holding means to be placed in position. As will be observed in Fig. 9, the ground glass 57 may have hair lines 59 placed therein to show the center thereof. A film-holding means 60, as is shown in Figs. 11 to 16a, comprises a pair of plates 61 and 62. Plate 61 is secured to plate 62 by means of a lip 63 fitting into a recess 64 at one end of plate 62 and at the other end by a cam 65 which projects into a recess 66 in plate 62 having a lip 67, the cam 65 being rotated by means of the thumb-piece 68. A piece of film 69 is placed between these plates 61 and 62 in a dark room, the film being placed in position over the opening 70 in plate 61, this opening being closed by a gate 72, which gate 72 has a sliding lever 73 attached thereto for operating it. The plate 61 is recessed as at 74, this recess 74 being of the exact size and shape as the edges of plate 46. When it is desired to expose the film 69 in the film holder 60, the holder 60 is placed on the plate 46 as shown in Figs. 12 and 13 and the lever 73 is operated to move the gate 72 to open position, as shown in Fig. 13, then, by means of the usual shutter and diaphragm controls in 49, the film is exposed for the predetermined period. It will be understood that this film holder 60 is generally intended to be used as a testing means to determine the proper lighting and exposure conditions and a small set of developing chemicals may be carried with this photographic apparatus and the piece of film 69 quickly developed to determine whether or not the proper conditions have been determined. Plate 62 has a finger catch 75 so that the plates 61 and 62 may be more easily separated after the exposure has been made.

In preparing to make a series of exposures, several prepared film holders 60 will be used until the proper lighting conditions have been determined and then a roll-holding camera box 29, such as is shown in Figs. 17 to 21, will be substituted therefor. This camera box 29 has a removable side 77 held in closed position by spring prongs 78, so that the camera may be loaded and unloaded, it being understood that loading will take place in a dark room. The roll of film 79 is placed on the spool 80 and is fed about spool 81. This film is similar to that used in moving picture cameras and a sprocket cylinder 82 having teeth 83 is used to control the feeding of the film. This cylinder 82 is of such diameter that a half of a revolution thereof will allow just enough film to feed thereby, to expose a new frame of film through the opening 70 in the plate 61, it being noted that plate 61 forming part of this camera box 29 is identical in construction with the plate 61 forming part of the film holder 60. The means for controlling the cylinder 82 comprises a leaf spring 84 fixed at one end to the arch 85 and having a tooth 86 guided in a depression 87 in the cylinder 82. Two longitudinal cuts 88 spaced 180° about the cylinder intersect the depression 87 so that the tooth 86 will enter the cut 88 at every half revolution of the cylinder 82. A rod 104 concentric with cylinder 82 turns an indicating disk 105 so that indicating lines 106 will align with indication 107 to show that the cylinder 82 has been turned just the right amount. The arch 85 has a cushion 89 to hold film 79 in position between it and the plate 61.

When the camera box 29 is used as the film-holding means, it is desirable to secure it firmly to the plate 46. Accordingly, a U-shaped prong 90 is secured to the fixed side 91 of the camera box 29 for limiting pivotal movement about the pivot 92. A projecting tongue 93 is pressed outwardly by means of a spring 94 received in a well 95 entering the side of the camera box 29, the pivotal movement of the spring being adjustably limited by the thumb screw 96. In operation, the thumb screw 96 is depressed into the well to thereby separate the U-shaped prong 90 from the plate 61, allowing the camera box 29 to be placed with the plate 46 in depression 74 of its plate 61, where it is held by the pressure of spring 94 pressing the prong 90 against the under side of plate 46 thus securely locking the camera in operative position. A collapsible focusing sight 97 is secured to the removable side 77 of the camera box 29 for use when it is desired to photograph more or less distant objects.

In operation, the entire apparatus may be easily carried, disassembled, in any convenient manner such as in a suitcase. When ready to use, the tripod 26 is set up and the camera 28 attached in position. Lamps 32 may be placed as shown in Figs. 1 and 2 or alternatively may be secured to the hooks 34 on tripod 26. The object 30, to be photographed, is placed below the camera lens as shown in Fig. 1. The camera 28 is properly leveled by adjusting it about the universal support 27, the spirit level 50 being used to determine that it is placed at an exact horizontal position. The focusing lens 52 is then placed in the upright position as shown in Fig. 6, and, the thumb screw 58 having been loosened, the lens barrel 47 is adjusted until the lens 48 is at the proper focus as determined through the eye-piece 55. Then the focusing lens 52 having been pivoted into the inoperative position shown in Fig. 5, a plurality of cut film-holding means 60 are successively exposed to determine the proper exposure necessary under the lighting conditions prevailing, the pieces of film being developed in a small, portable developing tank for test purposes.

Thereafter the roll-holding camera box 29 is substituted in place of the film holder 60 on the plate 46 and exposures made on the film in the camera box 29. It will be observed that the object 30 may be a book wherein a page is turned between each exposure or alternatively a separate sheet may be placed in position of object 30 between each exposure, the film being advanced one frame each time a new exposure is to be made by rotating the cylinder 82. Although the object 30 being photographed is shown as placed beneath the camera, it is obvious that an object on a wall or either nearby or distant objects, whether indoors or outside, may be photographed by appropriately adjusting the support.

It will be understood that the above description and accompanying drawings comprehend only the general and preferred embodiment of this invention, and that various changes in construction, proportion and arrangement of parts may be made within the scope of the appended claims, and without sacrificing any of the advantages of the invention.

The herein described invention may be manufactured and used by or for the Government of the United States of America for governmental purposes without the payment to me of any royalties thereon.

Having thus set forth and disclosed the nature of this invention what is claimed is:

1. In a portable photographic apparatus, supporting means, means having a universal movement for attaching a camera lens to said supporting means, film-holding means, means on said film-holding means and on said camera lens cooperating to secure the film-holding means in position on the camera lens, said film-holding means comprising a pair of cooperating plates, and means to detachably secure said plates together whereby a piece of cut film may be placed therebetween, one of said plates having a sliding gate to permit said film to be exposed.

2. In a portable photographic apparatus, a camera lens, said camera lens comprising a box, a barrel telescopically threaded in said box, a lens control mechanism affixed to the end of said barrel, and means for securing said barrel in any adjusted position in said box.

3. In a portable photographic apparatus, a camera lens, said camera lens comprising a box, a barrel telescopically threaded in said box, a lens control mechanism affixed to the end of said barrel, means for securing said barrel in any adjusted position in said box, and means on said box cooperating with a film-holding means.

4. In a portable photographic apparatus, a camera lens including a box and a lens supporting barrel adjustably secured in said box, means for cooperating with a film-holding means on said box, and means for focusing said lens, said focusing means being adjustable into focusing position above said means and removable in operative position out of the way of the film-holding means.

5. In a portable photographic apparatus, a camera lens including a lens supporting box, a focusing means for said lens pivotally mounted on said box, and a means cooperating with said focusing means yieldably holding it in focusing position and permitting it to pivot to inoperative position.

6. In a portable photographic apparatus, a camera lens, means for focusing said lens, said means comprising a pair of arms pivotally secured to said camera lens, an eye-piece, said arms being longitudinally slotted, a ground glass means supported in said slotted arms and adapted to cooperate with said eye-piece, and means for holding said arms with said focusing means in operative position above said lens or in inoperative position beside said lens to permit a film-holding means to be secured above said lens.

7. In a portable photographic apparatus, a camera lens and a film-holding means adapted to cooperate with said camera lens, said film-holding means including a plate, a film exposing gate in said plate, means for controlling the operation of said gate, and means cooperating with said plate to hold a section of film in position for exposure behind said gate, said plate having means to secure said cooperative means thereto.

8. In a portable photographic apparatus, a camera lens and a film-holding means adapted to cooperate with said camera lens, said film-holding means including a plate, a film exposing gate in said plate, means for controlling the operation of said gate, and means cooperating with said plate to hold a section of film in position for exposure behind said gate, said plate having means to secure said cooperative means thereto, said cooperating means comprising a recessed plate.

9. In a portable photographic apparatus, a camera lens and a film-holding means adapted to cooperate with said camera lens, said film-holding means including a plate, a film exposing gate in said plate, means for controlling the operation of said gate, and means cooperating with said plate to hold a section of film in position for exposure behind said gate, said plate having means to secure said cooperative means thereto, said cooperating means comprising a roll film-holding camera.

10. In a portable photographic apparatus, a roll film holding camera box, means for feeding film through said camera box, means for measuring and indicating a prescribed film exposure section, said means comprising a roller, sprocket means on said roller cooperating with said film, means yieldably stopping said roller at a predetermined point in its revolution, one end of said roller projecting through the side of the camera box, an indicia on said projecting end showing the position of the roller.

BYRON McCANDLESS.